May 7, 1935.  C. G. SUITS  2,000,723
WELDING SYSTEM
Filed Dec. 20, 1934
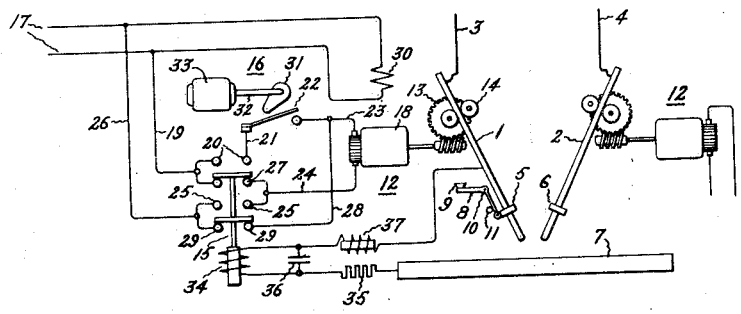
Inventor:
Chauncey G. Suits,
by Harry E. Dunham
His Attorney.

Patented May 7, 1935

2,000,723

UNITED STATES PATENT OFFICE 2,000,723

WELDING SYSTEM

Chauncey G. Suits, Scotia, N. Y., assignor to General Electric Company, a corporation of New York Application December 20, 1934, Serial No. 758,375

5 Claims. (Cl. 219—8)

My invention relates to automatic arc welding systems wherein means are provided for feeding an electrode to compensate for its consumption by the welding arc.

For uniform quality of welding it is necessary to maintain the arc length and voltage at a substantially constant value. This requires generally that in addition to a motor mechanism for moving the electrodes, means sensitive directly or indirectly to arc voltage be used for controlling the motor. This means is required to operate frequently and very often is in continuous operation.

It is an object of my invention to provide a system in which the frequency of operation of the control means is greatly reduced.

It is a further object of my invention to provide a control in which a reversing switch and a vibratory regulator whose frequency of operation may be adjusted are employed for intermittently energizing the feeding motor to obtain a forward feeding rate of the electrode which is slightly greater than its consumption by the arc when the arc voltage is too high and in which the excessive forward feeding of the electrode is periodically corrected through the agency of the same reversing switch which continuously energizes the motor in a reverse direction when the arc voltage becomes too low.

My invention will be better understood from the following description taken in connection with the accompanying drawing which diagrammatically illustrates one embodiment thereof.

In the particular arrangement illustrated a plurality of electrodes 1, 2 are connected by conductors 3, 4 to an alternating current welding source (not shown). These electrodes are held by supports 5, 6 with their arcing terminals within arcing distance of one another and the work 7. In the particular arrangement illustrated the support 6 is fixed and the support 5 is movable, being attached to one end of a bell-crank lever 8 the other end of which is provided with a finger piece 9. This lever is pivoted at 10 and is normally biased into engagement with a stop 11 which determines the separation of the electrodes by positioning support 5 relative to support 6. The operator by depressing the finger piece 9 can rotate lever 8 about pivot 10 and bring the electrodes into engagement with one another by displacing support 5 toward support 6. When the bell-crank lever is then permitted to swing back to the position illustrated, the electrodes are separated and an arc is struck between them.

Electrodes 1 and 2 are fed toward and away from one another and the work by reversible feed motors 12 through the agency of speed reducing gears 13 and feed rolls 14. Since the control for each of these feed motors is the same, the drawing has been simplified by illustrating only the control for one feed motor. It is to be understood, however, that both feed motors are controlled in the same manner.

The motor 12 is intermittently energized for rotation in the proper direction to impart a forward feeding motion to the electrode 1 through the agency of a reversing switch 15 and a vibratory regulator 16 by means of which it is connected to a source of supply 17. The motor 12 is continuously energized for rotation in the reverse direction through the agency of the same reversing switch by means of which it is also adapted to be connected to the source of supply independently of the vibratory regulator.

Intermittent energizing of the feed motor 12 is accomplished by connecting its armature 18 to the source of supply 17 through the following circuit: From one terminal of the source of supply 17 through conductor 19, contacts 20 of the reversing switch 15, conductor 21, contacts 22 of the vibratory regulator 16, conductors 23 and 24, contacts 25 of the reversing switch 15 and conductor 26 to the other terminal of the source of supply 17. The motor 12 is continuously energized by connecting its armature 18 to the source of supply 17 through the following circuit: From one terminal of the source of supply 17 through conductor 19, contacts 27 of reversing switch 15, conductors 24, 23, and 28, contacts 29 of the reversing switch 15 and conductor 26 to the other terminal of the source of supply 17. The field 30 of the motor 12 is permanently connected to the source of supply 17 and is consequently continuously energized.

The vibratory regulator 16 comprises contacts 22 which are normally biased to an open position and periodically closed by a cam 31 which is mounted on the shaft 32 of a motor 33. The speed of this motor is adjustable and is set so that the contacts 22 of the regulator are periodically closed with a frequency sufficient intermittently to energize the motor 12 in a manner to impart a forward feeding rate to the electrode 1 which is slightly greater than its rate of consumption by the arc. The motor 33 may be an electric motor or a mechanical motor so long as its speed of rotation is adjustable.

The reversing switch 15 is operated by a coil 34 which is connected to be responsive to an electrical condition of the welding circuit. As illustrated, it is connected across the electrode 1 and the work 7 through the agency of a non-linear circuit comprising a resistance 35, a capacitance 36 and a saturable inductance 37. In the arrangement illustrated the coil 34 is connected across the capacitance 36. The coil 34 of the reversing switch 15 may be directly connected to the welding circuit but when alternating current is used as the source of welding supply I prefer to make this connection through the agency of a non-linear circuit in order to obtain improved operating characteristics.

In a non-linear circuit such as above described unusual resonance effects occur which are different from those that occur in circuits where the flux path of the inductive element is almost wholly in air. If a circuit comprising series connected resistance, capacitance and saturable inductance is properly dimensioned, it will be observed that for a gradually increasing voltage of constant frequency the effective current is not proportional to the voltage but increases critically at a certain voltage. Similarly for a gradually decreasing voltage at constant frequency the effective current decreases critically at a certain voltage. For convenience I refer to the voltage at which the sudden increase in current takes place as the "resonant" voltage and the voltage at which the sudden decrease in current takes place as the "dissonant" voltage. By a proper selection of the constants of the non-linear circuit the resonant and dissonant voltages may differ from one another by a predetermined amount. The properties of non-linear circuits is dependent on the frequency and wave form of the voltage of the source. When the welding circuit is connected to a source of variable frequency and distorted wave form, I eliminate the resulting disturbances by using the circuit connections described and claimed in my application, Serial No. 613,696 for Electric circuits, filed May 26, 1932. In accordance with the invention there disclosed a circuit comprising a plurality of impedances having a branch voltage which changes linearly with the frequency of the circuit to be controlled is provided for energizing the non-linear circuit. The branch voltage is preferably taken from that impedance which suppresses the harmonic components of the voltages a maximum amount.

As has been pointed out in Letters Patent No. 1,942,055, Ralph A. Gilbert, granted January 2, 1934, where an arc is established between adjacently located electrodes within striking distance of the work the voltage between the electrode and the work varies as the distance between its arcing terminal and the work. It is, therefore, possible to employ this voltage to control the feeding of the electrode and such a control has been broadly claimed in the above-identified Letters Patent. In the particular system above-described the control embodying my invention has been substituted for the control illustrated and described in Letters Patent No. 1,942,055.

The operation of my control is as follows: The vibratory regulator 16 is set in operation by starting the motor 33. An arc is then established between the electrodes 1 and 2 by bringing their terminals into engagement with one another through the agency of the arc striking lever 8. If the voltage between the electrode 1 and the work 7 is greater than a predetermined value the relay 15 will move from the position illustrated to close its contacts 20 and 25. This completes the circuit above traced by means of which the motor 12 is intermittently energized through the agency of the relay 15 and vibratory regulator 16 to impart a forward feeding motion to the electrode. As has been stated above, the forward feeding rate of the electrode is greater than its consumption in the arc and, consequently, after a predetermined time the voltage between the electrode 1 and work 7 will decrease to a value at which the reversing switch 15 drops to the position illustrated in the drawing. In this position it completes circuits through its contacts 27 and 29 above traced whereby the motor is continuously energized in the reverse direction and acts to withdraw the electrode from the work to establish the desired operating voltage.

By reason of the difference in pick-up and drop-out voltage of the relay 34 and the difference in the resonant and dissonant voltages of the non-linear circuit illustrated, the frequency of operation of the reversing switch 15 tends to be very small under normal conditions when the vibratory regulator 16 is properly adjusted. A proper adjustment of this vibratory regulator also reduces the frequency of operation of its contacts 22 to nearly the minimum obtainable by any contact mechanism which could be designed to intermittently energize the feed motor and thereby properly control the feeding device. It will thus be seen that the particular control proposed makes it possible to employ means sensitive to arc voltage which is rugged and required to operate infrequently while the duty of periodically opening and closing the energizing circuit of the motor in order to control its speed is imposed on a vibratory regulator which may be of very rugged construction. The contacts 22 of the regulator 16 may be made of sufficient size to operate for long periods of time without destruction and, since these contacts are positively closed by a motor mechanism the operation of the system is at all times rendered positive.

Where a direct current source of welding supply is used the operating coil 34 of reversing switch 15 will be connected directly to the welding circuit. The operation of the system, however, will be essentially the same by reason of the inherent difference in the pick-up and drop-out voltages of the magnetically operated reversing switch 15.

It is apparent that instead of controlling the armature 18 of the feed motor 12, the field 30 of that motor may be controlled in the same manner to accomplish the same results as those obtained by controlling its armature circuit. It is also apparent that although a voltage control has been illustrated, other types of control may be used. For example, the reversing switch may be connected so as to be responsive to any desired characteristic of the welding circuit. It is also apparent that where the work constitutes one of the electrodes between which the arc is established, the system illustrated will function as above described. Furthermore, the operating coil of the reversing switch may be connected across the electrodes 1 and 2 in the system illustrated in order to maintain the arc length between these electrodes constant. Such a control, however, will not properly position the electrodes relative to the work as will the system described.

While I have illustrated and described but one embodiment of my invention, it is apparent that I do not wish to be limited to the particular arrangement illustrated but aim to cover in the appended claims all such modifications thereof as fall within the spirit and scope of my invention.

What I claim as new and desire to secure by Letters Patent of the United States, is:

1. In an arc welding system wherein means are provided for feeding an electrode to compensate for its consumption by the welding arc, means including an electric motor for operating said feeding means, means responsive to an arc voltage greater than a predetermined value for intermittently energizing said motor for rotation in the proper direction to impart a forward feeding rate to said electrode slightly greater than its rate of consumption by the arc, and means responsive to an arc voltage less than said predetermined value for continuously energizing said motor for rotation in the reverse direction.

2. In combination means for feeding an arc welding electrode connected in a welding circuit, means including an electric motor for operating said feeding means, means including a reversing switch and a vibratory regulator for intermittently energizing said motor for rotation in the proper direction to impart a forward feeding motion to said electrode, means including said reversing switch for continuously energizing said motor for rotation in the reverse direction, means responsive to an electrical condition of the welding circuit for operating said reversing switch, and means for controlling the frequency of operation of said vibratory regulator.

3. In combination means for feeding an arc welding electrode connected in a welding circuit, means including a motor having armature and shunt field circuits for operating said feeding means, a substantially constant voltage supply circuit, means including a reversing switch and a vibratory regulator for so connecting one of said motor circuits to said constant voltage supply circuit that said motor rotates in the proper direction to impart a forward feeding motion to said electrode, means including said reversing switch for so connecting said motor circuit to said constant voltage supply circuit independently of said vibratory regulator that said motor rotates in the reverse direction to impart a reverse feeding motion to said electrode, means responsive to an electrical condition of the welding circuit for operating said reversing switch, and means for controlling the frequency of operation of said vibratory regulator.

4. In combination means for feeding an arc welding electrode connected in a welding circuit, means including an electric motor for operating said feeding means, means including a reversing switch and a vibratory regulator for intermittently energizing said motor for rotation in the proper direction to impart a forward feeding motion to said electrode, means including said reversing switch for continuously energizing said motor for rotation in the reverse direction, a circuit connected to said welding circuit and having an abrupt change in its volt ampere characteristic for a predetermined change in the electrical conditions of said welding circuit, means responsive to said abrupt change in said circuit for operating said reversing switch, and means for controlling the frequency of operation of said vibratory regulator.

5. In combination means for feeding an arc welding electrode connected in a welding circuit, means including an electric motor for operating said feeding means, means including a reversing switch and a vibratory regulator for intermittently energizing said motor for rotation in the proper direction to impart a forward feeding motion to said electrode, means including said reversing switch for continuously energizing said motor for rotation in the reverse direction, a non-linear circuit connected to said welding circuit and having a resonant electrical characteristic at a predetermined electrical condition of said welding circuit, means responsive to the resonant and dissonant voltages of said non-linear circuit for operating said reversing switch, and means for controlling the frequency of operation of said vibratory regulator.

CHAUNCEY G. SUITS.